Sept. 11, 1962 P. VAN DILLEN ET AL 3,054,024

COMPATIBLE MODULE STRUCTURE

Filed March 11, 1959 2 Sheets-Sheet 1

INVENTORS
Paul VanDillen
BY Richard C. MacKay

Townsend and Townsend
attorneys

Sept. 11, 1962 P. VAN DILLEN ET AL 3,054,024

COMPATIBLE MODULE STRUCTURE

Filed March 11, 1959 2 Sheets-Sheet 2

Amplifier

Dector

OSC

Power

Inductor

Key

INVENTORS
Paul VanDillen
BY Richard C. MacKay
Townsend and Townsend
Attorneys

United States Patent Office 3,054,024

Patented Sept. 11, 1962

3,054,024

COMPATIBLE MODULE STRUCTURE

Paul Van Dillen and Richard C. MacKay, San Francisco, Calif., assignors to Polytron Industries, Inc., San Francisco, Calif., a corporation of California Filed Mar. 11, 1959, Ser. No. 798,645
1 Claim. (Cl. 317—101)

This invention relates to modular components which may be plugged into one another to obtain selected electronic functions.

It is well recognized in the electronic arts that there are a number of electronic or electrical circuits which are compatible with other circuits in such a way that each circuit comprises an independent or integral modular unit wherein the various units or modular building blocks may be assembled by appropriate electrical connections in various manners to accomplish a plurality of results. For example, an amplifier may be connected with an audio oscillator, with another amplifier, with a detector or with other input sources and the amplifier will function in exactly the same way, i.e., as an amplifier.

In the assembly of electronic units it is often desirable to have basic building blocks available which will perform the desired function and which can be adapted to be immediately assembled in such a way as to create desired results.

It is the principal object of this invention to provide a plurality of electrical and electronic circuitry arranged in blocks with male pin connectors on one side and female connectors on the other side. The blocks are arranged so the electrical or electronic circuitry within the blocks and the circuit connections to the various prongs are such that the circuits for the various blocks are compatible with one another and can be assembled in almost an infinite variety of combinations to accomplish a great many functions. One of the blocks, for example, may contain an amplifier, another block may contain a power supply, a third block may contain a detector and an RF pick-up unit and a fourth block may contain a speaker or a connection for an earphone. When the blocks are assembled there is therein provided a two-stage radio receiver. It is also possible that a microphone may be used with the amplifier in place of the detector or that an oscillator circuit in another block may be plugged into the amplifier.

It is well known in electronic packaging that circuit components have been formed as integral or modular units in which the circuit components will plug into a basic main frame. However, in such circuits the main frame must be wired in some predetermined pattern so as to allow the modular units to accomplish some specific function.

In the present invention the electronic modular units are adapted to plug into each other so that there is no need for a main frame or external connection for the device in order to allow the device to perform its desired functions.

A further object of this invention is to provide a unique casing for a modular electronic circuit which is formed to provide a substantially rectangular hollow chamber in which various electronic components may be mounted. The end walls of the casing are provided with a solid terminal block in which the female and male connector elements are imbedded. The blocks in addition form supporting elements to give additional structural rigidity to the casing.

A still further object of this invention is to provide a plurality of casings which are mutually pluggable into one another in which some of the casings are provided with control elements which project outwardly from one side of the casing so that when the casings are in assembled form the control elements will appear on a common face of the assembled structure.

Other objects of the present invention will become apparent upon reading the following specification and referring to the accompanying drawings in which similar characters of reference represent correponding parts in each of the several views.

Figure 1:
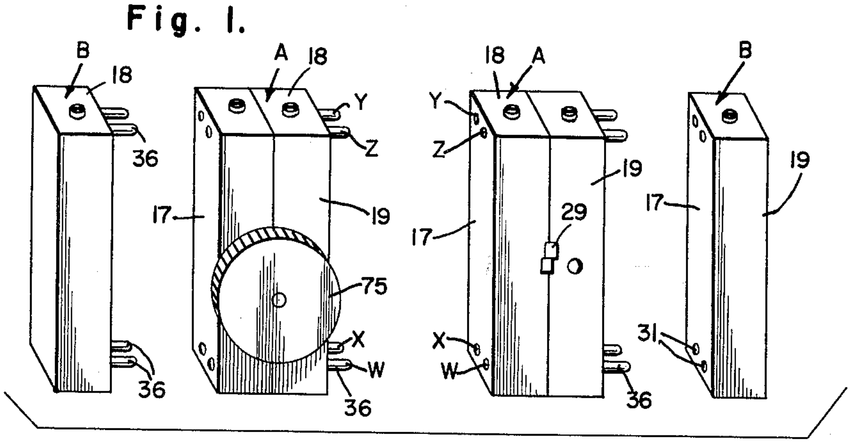
FIG. 1 is an exploded perspective view showing four of the modular units of this invention.

Referring now to the drawings the modular units of this invention are each formed by substantially rectangular casings each indicated at A and by half casings indicated at B. The full casing is a combination of the half casings.

Each half case is formed by a face plate 17 having a rectangular rim comprising two end walls 18, a panel wall 19 and a rear wall 20. Two half casings are mounted together by two mating connecting elements 28 mounted on the outer edge of each wall 20 in such a way as to form a locking hinge connection between the two mating walls 20. The walls 18 are then held in place by a centralized snap connector 29 so that the two half cases B mounted together form a fully enclosed case A having therein a hollow cavity in which electrical components may be mounted.

Terminal blocks 30 are mounted on the inside face of each of the end walls 18. Terminal blocks 30 contain a pair of female connector elements 31 with electrical contact connector elements 32 which project into the interior of the cavity of the box or casing from female connector 31. Face plate 17 is formed with an aperture 35 in alignment with connector 31. The connecting blocks 30*a* each carry a pair of male connector elements 36 which pass through an aperture 37 in face plate 17. The male connector is electrically connected to a terminal element 39 which projects interiorly into the cavity of casing A.

All casings A are formed of similar dimension and the male connector prongs 36 are each aligned to fit into the female connectors of another block. The male plugs constitute the output connectors and the female plugs constitute the input connectors of the casing so that there is a consistent standard in this respect.

The half cases B are each covered by a cover face 40. The half cases are arranged for housing components of smaller dimension under conditions which do not require the full cubic displacement of the complete box. The covers for the half blocks are mounted by hinge connectors 28 on wall 20 and a snap connecting element 29 is mounted on front wall 19.

Each of the full cases A comprises four electrical connections on each side of the block which are arranged to electrically engage with similar mating electrical connections of an adjacent block. These terminals are marked as terminals W, X, Y and Z in the drawings. The terminal of adjoining cases are assembled with the output W, X, Y and Z connectors 36 of each of the boxes in electrical contact with the input W, X, Y and Z connectors 31 respectively.

In FIGS. 5 through 12 there is schematically shown a plurality of suggested compatible circuits which may be employed with the cases A and B. In each of the devices the terminal block W is the equivalent of a common or ground terminal and the terminals X are the opposite common terminal. The terminals Y and Z comprise the signal terminals for the actual passage of information.

Figure 5:
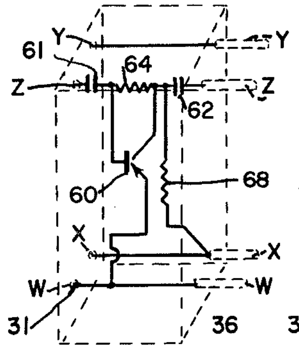
FIG. 5 is a circuit diagram of an amplifier.

In FIG. 5 there is provided an amplifier formed by transistor 60 which is of conventional circuit construction having a capacitive input from the input of terminal Z, as indicated at 61, and a capacitive output 62 to the output of terminal Z through a load resistor 64. The power to the transistor is supplied from terminals W and X through a resistor 68. Terminal connectors Y of the block are interconnected together without being connected to any other circuit component.

Figure 2:
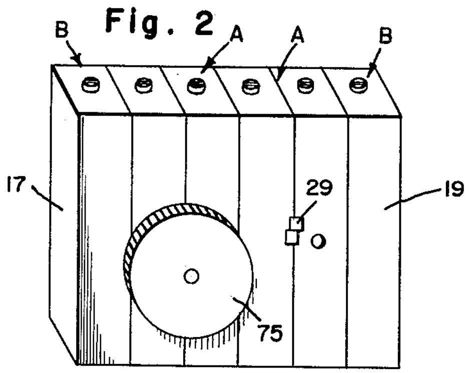
FIG. 2 is a perspective view showing the units of FIG. 1 in the assembled condition.
Figure 3:
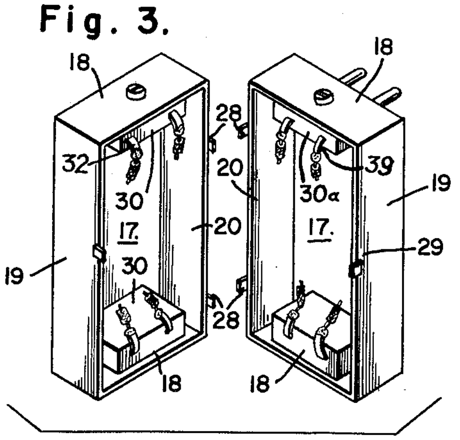
FIG. 3 is a view of the two segments forming the casing.
Figure 4:
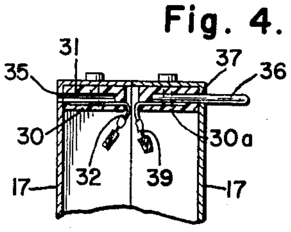
FIG. 4 is a sectional view showing the male and female prong connectors.
Figure 6:
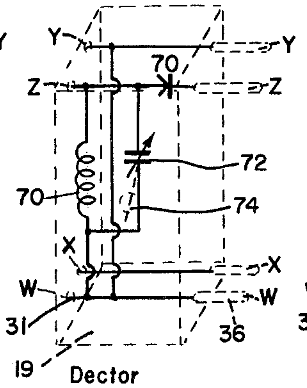
FIG. 6 is a circuit diagram of a detector.

In FIG. 6 there is provided a detector circuit having a tuned circuit 70 and a rectifier 71. Tuned circuit 70 comprises a coil and a variable condenser indicated at 72 which has a control shaft 74 extending outwardly from wall 19. A knob such as indicated at 75 in FIGS. 1 and 2 can be mounted on shaft 74 so as to effect adjustment of the condenser. In this circuit the detector which comprises a diode rectifier 71 is mounted between the input and output of terminal Z and the tuned circuit is connected to the terminal W. The input and the output of the terminals Y and the input and output of terminals X are respectively connected together and do not connect to the other elements of the circuit.

Figure 7:
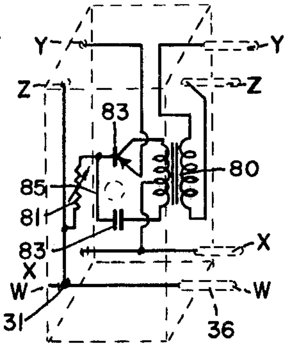
FIG. 7 is a circuit diagram of an oscillator.

FIG. 7 includes an audio oscillator circuit having among its components a transformer 80, a variable resistor 81, a transistor 82 and a capacitor 83. The oscillator is connected to the two power lines comprising connectors X and W and the output from the transformer is connected to the output of the two connections Y and Z. The input to Y and Z is connected to the control circuit for the oscillator which when closed will cause the oscillator to go into oscillation and when open will cause the oscillator to be released or be out of oscillation.

Variable resistor 81, which causes changes in frequency of the oscillator, is controlled by a shaft schematically illustrated at 85 which projects outwardly from panel 19 and is provided with a knob so that the adjustment of the oscillator can be controlled by rotating the knob on the panel.

Figure 8:
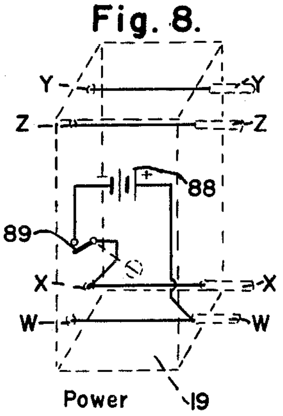
FIG. 8 is a circuit diagram of a power supply.

The circuit of FIG. 8 includes a power supply in which there is provided a battery 88 and a switch 89 by which the battery may be connected to the circuit. The battery is connected to the terminal lines X and W in the appropriate polarity to operate the circuits. The switch is mounted on panel 19 so that the switch may be actuated from a point external of the casing.

Figure 9:
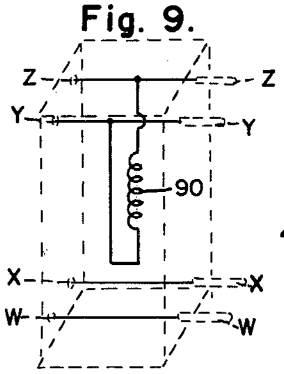
FIG. 9 is a circuit diagram of an inductive pick-up or radiator.

In FIG. 9 there is provided an inductor 87 or radiator which comprises a coil 90 connected to the two terminals Y and Z.

Figure 10:
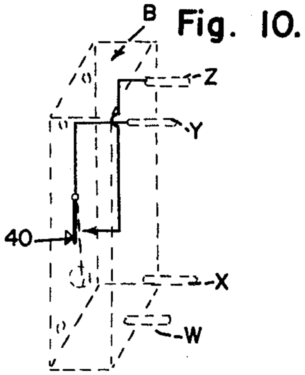
FIG. 10 is a circuit diagram of a key.

The apparatus of FIG. 10 includes a circuit breaker or telegraph key mounted on face 40 within a smaller half casing B which is arranged in the closed position to close the contact between terminals Y and Z.

Figure 11:
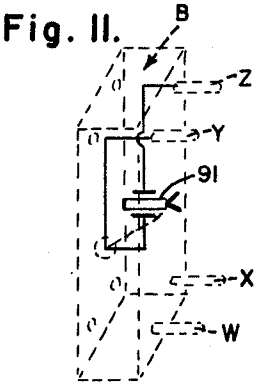
FIG. 11 is a circuit diagram of a microphone.

FIG. 11 includes a microphone 91 which is connected to terminals Z and Y. The microphone is mounted on face 40 so that the casing may be used as an integral microphone unit in and of itself.

Figure 12:
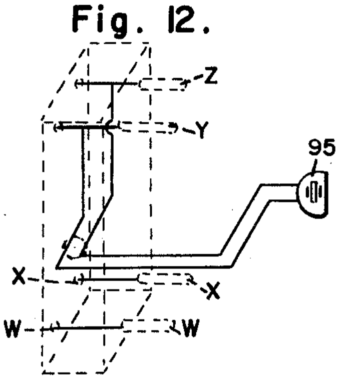
FIG. 12 is a circuit diagram of a combination speaker and microphone.

In the device of FIG. 12 there is provided a microphone of the type adaptable for use either as a speaker or as a microphone, that is, either an input or an output device.

It is noted that the electronic circuitry within casings A and B comprises circuits which are of three classes, that is, circuits which are front end or the first circuit of an electronic device, circuits which are intermediate circuits which may have other circuits before and/or after the intermediate circuit and circuits which are the output device in which there is no further circuit on the output end of the device.

In the block circuits all the circuits that are input devices such as the telegraph key of FIG. 10 and the microphone circuit of FIG. 11 are provided only with output or male connectors 36 for the terminals W, X, Y and Z while devices which may be used only as an output device are provided only with female connectors 31 for the terminals W, X, Y and Z. The device which may be used for either input and/or output or may be used as intermediate circuits are provided with both female and male connectors 31 and 36 respectively for the terminals W, X, Y and Z. In all cases for such devices the male and the female terminals are either directly connected to each other or connected to each other through the electrical circuitry contained within the box or casing. By this means there is complete electrical compatibility of the device insofar as the proper supply of signal and power requirements are concerned.

In operation the blocks may be assembled to create a radio set by installing the block of FIG. 6 into the block of FIG. 8 or conversely the block of FIG. 8 may be plugged into the block of FIG. 6 and the two blocks are then plugged into the amplifier block as shown in FIG. 5. The amplifier of FIG. 5 is then plugged into the speaker of FIG. 12 wherein the device is functional as a radio receiver having one stage of audio amplification. As an alternate, should it be desired to use the device as an audio or code practice oscillator the blocks of FIGS. 10, 7, 5 and 12 are interconnected so that when telegraph key 40 is closed the oscillator within the circuit of FIG. 5 will oscillate and thence be amplified by the amplifier in the circuit of FIG. 5 with both the oscillator and the amplifier being powered by battery 88 and with the output being displayed by the speaker or transducer 95.

As another point of variation telegraph key 40 of the circuit of FIG. 10 may be removed and microphone 91 of FIG. 11 installed instead. The microphone of FIG. 11 is a low type impedance microphone such as a carbon microphone which is arranged to cause the oscillator to oscillate and to be modulated according to the resistance changes of the microphone. The device thus functions as a small communication system. To further illustrate the flexibility of the device the speaker of FIG. 12 may be removed and inductor 87 as shown in the block of FIG. 9 may be installed so as to receive the output from the amplifier of the circuit of FIG. 5. The inductor 87 acts as an inductive radiator so that an appropriate receiving device can be used to receive the signals from another position.

It is further noted that the device may be used as a receiver to receive inductive radiation by installing inductor 87 in the circuit of FIG. 9 to the input of the detector as shown in FIG. 6 and with the combining of the power supply and a speaker such as employing the circuits of FIGS. 8 and 12. It can thus be seen that even with the small number of illustrative circuits disclosed that an almost infinite variety of circuit combinations can be effected without unplugging or plugging wires or in any way changing the basic circuitry of any of the individual modules.

It is to be understood that the particular circuits illustrated are for purposes of illustration only and may be expanded upon without in any way departing from the spirit of the invention.

What is claimed:

In a casing of the type adapted to house electrical components of modular construction in which multiple casings can be connected together to create an integrated function the improvement comprising: said casing being formed of two half sections; each said half section having a plate bounded by four walls; a terminal block mounted on the inside of opposite end walls of each section; a first one of said terminal blocks carrying female connectors opening through the plate and second ones of said terminal blocks carrying male connectors extending exteriorly of said plate; snap connectors mounted on the walls of each section to lock said sections together in mating alignment; and electrical components in said casing connected to said male and female connectors.

References Cited in the file of this patent

UNITED STATES PATENTS

| | | |
|---|---|---|
| 1,900,595 | Weber | Mar. 7, 1933 |
| 2,783,416 | Butler | Feb. 26, 1957 |
| 2,910,672 | Patka | Oct. 27, 1959 |

OTHER REFERENCES

Radio-Craft, January 1939, pages 400, 401 and 431.